United States Patent [19]

Fromme

[11] Patent Number: 4,712,186

[45] Date of Patent: Dec. 8, 1987

[54] METHOD OF DETERMINING ROTARY SPEED OF A ROTATING ELEMENT IN A BRAKING EFFORT REGULATION SYSTEM

[75] Inventor: Georg Fromme, Seevetal, Fed. Rep. of Germany

[73] Assignee: Robert Bosch GmbH, Stuttgart, Fed. Rep. of Germany

[21] Appl. No.: 771,983

[22] Filed: Sep. 3, 1985

[30] Foreign Application Priority Data

Sep. 7, 1984 [DE] Fed. Rep. of Germany ....... 3432883

[51] Int. Cl.$^4$ .................. B60K 31/00; G01P 3/00; G06G 7/70/7/76
[52] U.S. Cl. .................. 364/565; 364/426; 180/197
[58] Field of Search ............... 364/565, 426; 180/197

[56] References Cited

U.S. PATENT DOCUMENTS

| | | | |
|---|---|---|---|
| 3,594,555 | 7/1971 | Klein et al. | 364/426 |
| 3,609,313 | 9/1971 | Lucien | 364/426 |
| 3,677,094 | 7/1972 | Kupfmuller | 364/426 |
| 4,033,633 | 7/1977 | Miller et al. | 304/426 |
| 4,184,281 | 11/1978 | Skaroada | 364/426 |
| 4,395,761 | 7/1983 | Sato et al. | 364/426 |
| 4,435,768 | 3/1984 | Arikawa | 364/426 |
| 4,466,066 | 8/1984 | Saunweber et al. | 364/426 |
| 4,499,543 | 2/1985 | Matsuda | 364/426 |
| 4,517,647 | 5/1985 | Harada et al. | 364/565 |

*Primary Examiner*—Felix D. Gruber
*Assistant Examiner*—Danielle Laibowitz
*Attorney, Agent, or Firm*—Frishauf, Holtz, Goodman & Woodward

[57] ABSTRACT

A braking effort regulation system is improved by providing a rotary speed signal, which is accurate even under slow rotation conditions.

To obtain an accurate analog value of the rotary speed of a rotating object, typically the wheel of an automotive vehicle, from a transducer (1) having at least approximately sinusoidal output voltage, the transducer output voltage ($u_S$, $u_{S1}$) is converted into a digital signal ($u_{S2}$), preferably filtered to obtain a filtered signal ($u_{S3}$). The inverse function ($y_2 = \arcsin(A_o \sin \omega t) = c(\epsilon_R 7 \omega t)$), $y_2 = \arcsin(A_o \sin \omega t)$ is then calculated. By differentiation and determination of the differential value of the signal $y_2$, a signal ($y_R$, $y_3$) is then obtained which, after an additional preferably filtering step, will result in the desired speed-representative output signal ($n_R$).

11 Claims, 2 Drawing Figures

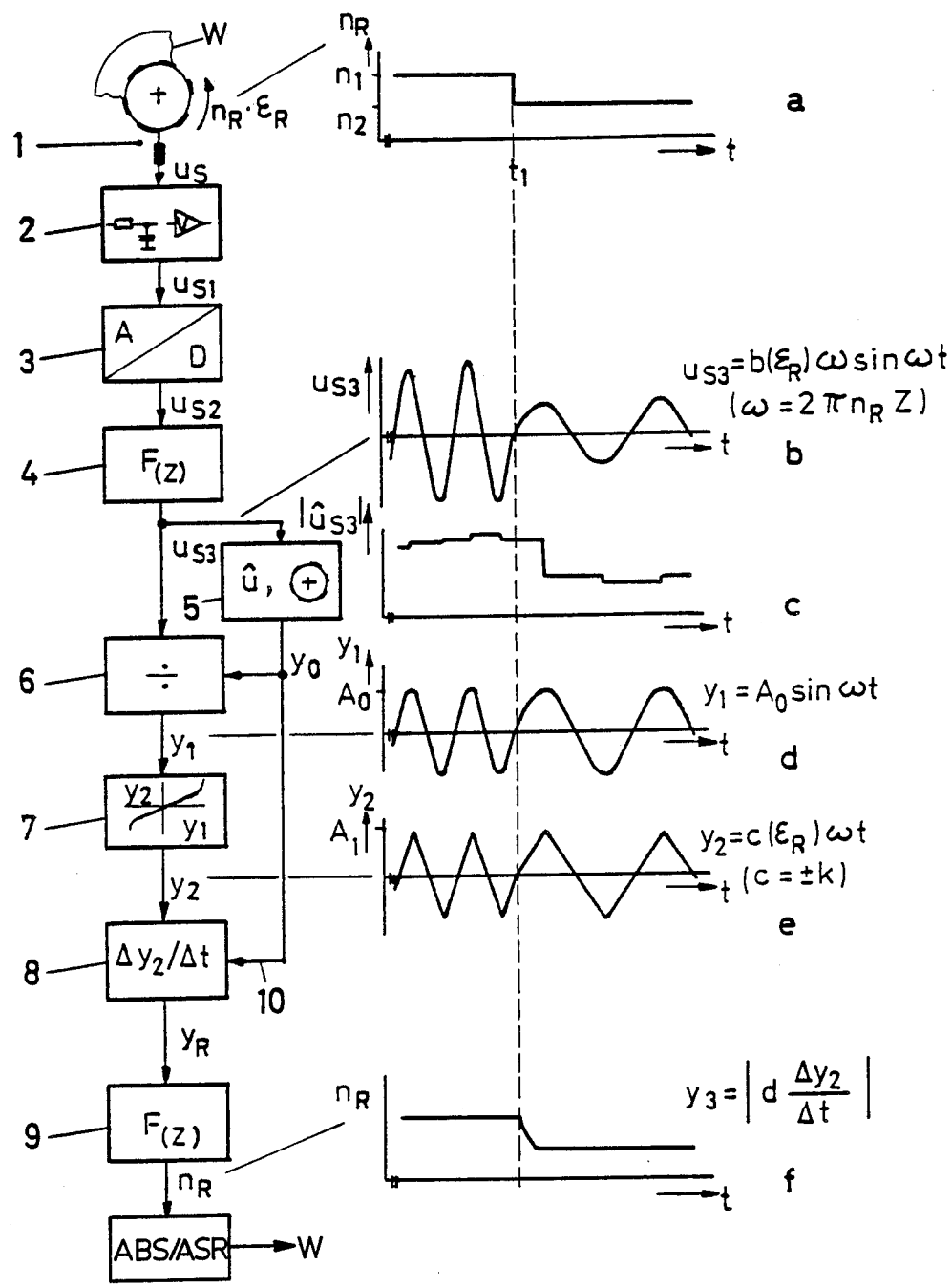

METHOD OF DETERMINING ROTARY SPEED OF A ROTATING ELEMENT IN A BRAKING EFFORT REGULATION SYSTEM

The present invention relates to a method to determine the speed of a rotating element, and more particularly the speed of a wheel of a motor vehicle, to provide output signals for use in anti-brake lock systems (ABS) anti-wheel slip (ASR) systems and the like, known generically as slippage-prevention systems; it is particularly effective to determine the wheel speed even though the wheel may be turning very slowly.

BACKGROUND

Various types of wheel speed transducers are known which provide pulses, the frequency of which is representative of the speed of a rotating element. When analyzed with respect to standard time intervals, or time norms, the speed can be calculated as the average pulse rate with respect to a predetermined timing interval. This system, thus, is effectively a counting system with respect to recurring time periods. Transducers which provide such output signals, typically, are inductive transducers which are fixed on a body of a vehicle, and magnetically influenced by star wheels gears, or other toothed elements coupled to a rotating elment of the vehicle, for example, to a vehicle wheel. Rough operating conditions which are found in actual practice, for example in automotive vehicles, require high performance, highly reliable transducers, and, thus, for automotive use, inductive transducers are used exclusively. Such inductive transducers have a fixed sensor and a transducer wheel. Current speed measuring systems, for example for anti-brake lock systems (ABS), use a gear wheel as the transducer or star wheel, having symmetrical teeth. The fixed transducer element is a coil with a permanent magnet. The magnet, coil and star wheel form a magnetic loop, the magnetic resistance or reluctance of which changes as the angle of the wheel, with respect to the fixed transducers, changes, that is, during the transition between teeth and gaps between the teeth. The resulting change in magnetic flux induces an alternating voltage wave in the coil which has a voltage proportional to the speed of the change of magnetic flux, and which, if the teeth are effectively square, will have an approximately sinusoidal wave form. The amplitude of the sensor voltage is dependent on the speed of the star wheel as well as the distance between the wheel and the transducer pick-up or coil element.

In various measuring methods to determine the speed of such a wheel, the zero-crossover of the signal is used to determine the vehicle wheel speed. If the vehicle wheel, and hence the star wheel, turns very slowly, that is, at low speeds, the distance of sequential changes in polarity of the signal—with respect to time—is long, and the wave shape will be shallow. It is difficult to evaluate such signals.

THE INVENTION

It is an object to provide a method to improve the resolution of signals derived from wheel speed sensors, and more particularly of speed sensors coupled to automotive wheels, in which the speed changes widely, and which provides output signals which are truly representative of wheel speeds, even under very slow speed conditions.

Briefly, analog output signals derived from the wheel speed sensor coil are converted into digital signals, for example in an analog/digital converter. The digitized signals are then processed by calculating the inverse function thereof to derive an essentially triangular wave-shaped signal. The essentially triangular wave-shaped signal will have linear portions; the degree of the slope of the linear portions of the triangular wave-shaped signals is determined and, by differentiating, the slope is determined to thus obtain a signal, the level of which, or similar characteristic, is then representative of the speed of the element.

DRAWINGS

FIG. 1 is a basic schematic combined block-and-flow diagram of the steps in carrying out the method; and FIG. 2, drawn alongside FIG. 1 for ease of comparison, shows the signals which arise upon carrying out the respective steps of the method.

DETAILED DESCRIPTION

A transducer combination 1 (FIG. 1) is formed by an inductive pick-up cooperating with a star wheel which rotates at varying speeds, for example changing with traffic conditions. The output signal of the transducer is determined by $$u_S(t) = b(\epsilon_R) \cdot \omega \cdot \sin \omega t \quad (1)$$

wherein $$\omega = 2\pi n_R \cdot Z \quad (2)$$

The following symbolic notation is used:

$b(\epsilon_R)$: a factor which includes a constant value dependent on the construction of the transducer, as well as angular rotary influences, for example out-of-round, or out-of-symmetry or yaw of the star wheel $\epsilon_R$: angle of wheel rotation $n_R$: wheel speed $Z$: number of teeth about the circumference of the transducer wheel, typically a star wheel or the like.

The signal $u_S(t)$ is filtered in a filter 2 to suppress stray or noise voltages, hereinafter simply interference voltages. The resulting voltage $u_{S1}$ is then applied to an analog/digital converter (A/D) 3. The resulting digital signal $u_{S2}$ is applied to a signal processing circuit 4 which includes a non-recursive filter and a high-pass filter with a limiting or corner frequency of $f < 0.1$ Hz, to generate a signal $u_{S3}$. This will be a sinusoidal signal, illustrated in FIG. 2, graph b. Graph a of FIG. 2 shows the relationship of wheel speed $n_R$ with respect to time. As can be seen, the speed first is at a higher level $n_1$ and then drops abruptly at time instant $t_1$ to the level $n_2$. This speed condition will be the basis of the explanation of the steps in accordance with the present invention, and the graphs of b to f of FIG. 2 all relate to this speed distribution.

The signal $u_{S3}$ derived from the signal processing circuit 4 is applied to two processing elements, namely to a block 5 and to a divider block 6. The signal applied to block 5 determines the extreme values $\hat{u}_{S3}$ of the signal wave of the signal $u_{S3}$ shown in the graph b of FIG. 2.

The output obtained from the extreme value determining block 5, which may, for example, include a peak detector, is shown in graph c of FIG. 2.

The output signal from block 4 is, further, connected to a divider 6, which, additionally, receives the output from block 5 as a divisor. The following signals will be derived:

$$y_1 = \frac{u_{S3}}{\hat{u}_{S3(m)}} = A_0 \sin \omega t \tag{3}$$

$$y_1' = \frac{u_{S3}}{\hat{u}_{S3(m)} \cdot b_1(m+1)} \tag{4}$$

The signal $y_1 = A_0 \sin \omega t$ is the theoretically correct signal. The signal $y_1'$ additionally considers compensation of errors in the transducer by the factor $b_1(\epsilon_R)$, which includes values specific to the particular transducer structure. m is the numerical value of the extreme values. The factor $b_1(m+1)$ utilizes the extreme value $\hat{u}_{S3}(m)$ for processing.

Blocks 5 and 6 effect equalization or standardization of the signal $u_{S3}$. The normalized or standardized signal $y_1$ is shown in graph d of FIG. 2.

The normalized or standardized signal is then applied to a block 7 in which the inverse function for the signal $y_1$ is determined, that is, the signal is transferred to:

$$y_2 = \arcsin (A_o \sin \omega t) = c(\epsilon_R)\omega t. \tag{5}$$

The value $c(\epsilon_R) = \pm k$ includes the periodicity of the signal $y_2$. As shown in graph e, it is a triangular function. This signal is applied to a differentiator 8 which generates from it the signal $y_3$ $$y_3 = d \frac{\Delta y_2}{\Delta t} \tag{6}$$

which is a signal directly proportional to the speed $n_R$, and has a level or value representative of the speed, and is thus the desired output signal.

This signal, preferably, is further filtered in a filter 9. The output signal, after filtering, is shown in graph f of FIG. 2.

FIG. 1 illustrates a connection between block 5 to the differentiator 8. This connection is to indicate that the differentiator 8 can be controlled by the extreme value periods, that is, may process only 90% of the signal amplitude of $y_2$ (t). For the remaining time, the signal course $u_{S3}$ is directly utilized. The standardization or normalization as shown need not be carried out if the signal amplitude derived from the transducer is independent of speed—e.g. if the pick-up is an optical pick-up or the like.

The method can be used also with output signals derived from the sensor combination 1 even if the sensor signal substantially deviates from sinusoidal form. The calculating method is not dependent on sinusoidal wave form; it calculates the inverse function with respect thereto.

What is claimed is:

1. In a system for preventing slippage of at least one wheel of a vehicle, a method of regulating wheel braking effort as a function of rotary speed of a vehicle wheel subject to wide speed variations and of providing control output signals representative of wheel speed even under slow wheel operating conditions, said slippage-preventing system having
a transducer (1) which provides a transduced output signal ($u_S$) having a frequency representative of the speed of the wheel and an evaluation circuit (2-9) which processes said transducer output signal ($u_S$) and provides the control output signal ($n_R$) which has a characteristic value which is representative of and proportional to the speed of the wheel,
comprising the steps of
digitizing the transducer output signal ($u_S$) to derive a digital signal ($u_{S2}$);
calculating (7) the inverse function of the digital signal to derive an essentially triangular-wave-shaped signal ($y_2$);
determining (8) the degree of slope of the essentially linear portions of the triangular-wave-shaped signal ($y_2$) to derive a differentiated signal ($y_3$), which differentiated signal is representative of the speed of the wheel;
obtaining said control output signal ($n_R$) from the differentiated signal ($y_R$); and
regulating braking effort in said slippage-preventing system as a function of said control output signal ($n_R$).

2. A method according to claim 1, including the step of filtering the transducer output signal ($u_s$) to remove interference components, and to derive a filtered output signal having an essentially smooth waveform ($u_{s1}$).

3. A method according to claim 2, wherein said step of filtering the transducer output signal comprises carrying out an analog filtering step before the step of digitizing the transducer output signal.

4. A method according to claim 1, further including the step of eliminating direct components to derive a signal ($u_{s3}$) having only alternating components.

5. Method according to claim 4, wherein the step of digitally filtering and the step of removing direct components are combined to obtain a filtered, direct component-free signal ($u_{S3}$).

6. Method according to claim 1, further including the step of digitally filtering the digitized signal ($u_{S2}$) to obtain a digitally filtered signal ($u_{S3}$).

7. Method according to claim 1, further including the step of normalizing the digitized signal to obtain a normalized signal ($y_0$).

8. Method according to claim 7, wherein the step of normalizing the signal includes dividing the digitized signal ($u_{S2}$, $u_{S3}$) by an extreme value ($\hat{u}_{S3}$) of the digitized signal to derive a normalized or standardized signal ($y_1$).

9. Method according to claim 7, wherein the step of obtaining the normalized signal ($y_1$) includes the step of storing data representative of manufacturing tolerances in the transducer (1) with respect to angular position upon rotation of a transducer element, and applying, continuously, speed-related differential extreme values during one continuous rotation of the rotary element of the transducer to eliminate tolerance variations due to installation or inaccuracies of the transducer during rotation of the rotary element thereof, and applying said stored signals to the signal ($u_{S3}$) being normalized to obtain a tolerance and error compensated normalized signal ($y_1'$).

10. Method according to claim 7, wherein the step of determining the degree of slope of the linear portions of the triangular wave signal ($y_2$) includes a differentiating step (8).

11. Method according to claim 10, wherein the differentiating step is carried out only within regions of the wave during which the triangular signal is essentially of straight line wave form.

* * * * *